(12) United States Patent
Findlay et al.

(10) Patent No.: US 7,077,870 B2
(45) Date of Patent: *Jul. 18, 2006

(54) LAUNDRY COMPOSITION

(75) Inventors: Paul Hugh Findlay, Wirral (GB); Dax Kukulj, Kingston (AU); David Richard Arthur Mealing, Wirral (GB)

(73) Assignee: Unilever Home & Personal Care USA division of Conopco, Inc., Greenwich, CT (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/013,964

(22) Filed: Dec. 11, 2001

(65) Prior Publication Data

US 2002/0155979 A1    Oct. 24, 2002

(30) Foreign Application Priority Data

Dec. 15, 2000  (EP) ................................. 00311227

(51) Int. Cl.
  C11D 3/37 (2006.01)
  C11D 3/22 (2006.01)
  B08B 3/04 (2006.01)

(52) U.S. Cl. .................... 8/137; 510/101; 510/327; 510/470; 510/473; 510/475; 510/500

(58) Field of Classification Search ............ 510/101, 510/327, 470, 473, 475, 500; 8/137
See application file for complete search history.

(56) References Cited

U.S. PATENT DOCUMENTS

| 4,372,328 A | 2/1983 | Kausch et al. | |
| 4,464,506 A | 8/1984 | Alberts et al. | |
| 6,288,022 B1 * | 9/2001 | Clark et al. | 510/470 |
| 6,384,011 B1 * | 5/2002 | Leupin et al. | 510/473 |

FOREIGN PATENT DOCUMENTS

| EP | 0 979 861 A1 | | 2/2000 |
| EP | WO 02/48302 | * | 6/2002 |
| WO | 98/29528 | | 7/1998 |
| WO | 99/14245 | | 3/1999 |
| WO | WO 99/14245 | * | 3/1999 |
| WO | WO 99/14295 | * | 3/1999 |
| WO | 00/18860 | | 4/2000 |
| WO | 00/18861 | | 4/2000 |

OTHER PUBLICATIONS

Partial European Search Report #EP 00 31 1227 dated May 29, 2001, 3 pp.

* cited by examiner

*Primary Examiner*—Brian P Mruk
(74) *Attorney, Agent, or Firm*—Alan A. Bornstein

(57) ABSTRACT

A laundry treatment composition comprising composition comprising:
i) a polymer having an average repeat unit of:

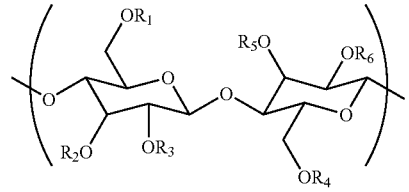

in which $R_{1-6}$ are independently of one another selected from H, a hydrolysable group, or a fibre reactive group in which when $R_{1-6}$ is a hydrolysable group the degree of substitution is 0 to 1, and wherein $R_{1-6}$ is a fibre reactive group the degree of substitution is from 0.05 to 1 and;
ii) a carrier agent selected from surfactants, softening compounds or water wit the proviso that when the carrier agent is water the composition further comprises perfume.

16 Claims, No Drawings

LAUNDRY COMPOSITION

TECHNICAL FIELD

The present invention relates to an ingredient for laundry cleaning or treatment products, for deposition onto fabric during a washing, rinsing or other treatment process. It further extends to compositions containing such an ingredient and methods of fabrics treatment using these compositions.

BACKGROUND OF THE INVENTION

The laundry process generally has several benefits for fabric, the most common being to remove dirt and stains from the fabric during the wash cycle and to soften the fabric during the rinse cycle. However, there are numerous disadvantages associated with repeated use of conventional laundry treatment compositions and/or the actual laundry process; one of these being a fairly harsh treatment of fabric in the laundry process.

The present invention is directed towards maintaining the new appearance of fabric and enhancing the feel and softness of the fabric despite the laundering process. Examples of retained fabric appearance are that the fabric retains its original colour (that is less dye loss and dye transfer), does not fuzz or pill, prevents the fabric from bagging and maintains its surface definition and appearance.

A further advantage of the present invention is that fabrics treated with the composition have a tendency to become less creased and/or wrinkled and do not become thin due to the loss of fibres.

In laundry cleaning or treatment products, it is essential for some ingredients to be deposited onto and adhere to the fabric for them to deliver their beneficial effects. Typical examples are fabric conditioners or softeners.

WO 00/18860 and WO 00/18861 describe agents which deposit cellulose or cellulose-like materials onto the fabric to at least partially replace the lost material of the fibre and which add to the softening of fabrics.

EP-A-0 084 772 discloses a graft polymer dispersion comprising a vinyl-containing organopolysiloxane, an organopolysiloxane with unsubstituted silicon atom and polymerised units of vinyl monomers. Aqueous emulsions of these materials are used as water repellents to be applied to textiles during manufacture, whilst also endowing a softening and smoothing effect. Unlike conventional silicones they are said to offer the advantage of retaining elasticity and ※recovery ※of the weave. There is also a disclosure of strengthening of textiles during manufacture by application of acrylates, polyacrylates and polymetacrylates.

WO-A-98/29528 discloses cellulose ethers in which some substituents are (poly)alkoxylated, analogues of the latter in which the (poly)alkoxylated groups are terminated with a cationic moiety in the form of a quaternary ammonium group, and cellulose ethers in which some substituents are carboxylic acids in the salt form (i.e. the materials are essentially carboxymethylcellulose variants WO-A-99/14245 discloses laundry detergent compositions containing cellulosic based polymers to provide appearance and integrity benefits to fabrics. These polymers are cellulosic polymers in which the saccharide rings have pendant oxygen atoms to which substituents R' are bonded, i.e. they are attached to the rings via an ether linkage. The groups R' can be hydrogen, lower alkyl or alkylene linkages terminated by carboxylic acid, ester or amide groups. Optionally, up to five alkyleneoxy groups may be interspersed between the groups are the respective oxygen atom.

U.S. Pat. No. 4,372,328 discloses material for tobacco smoke filters comprising cellulose fibres containing amino groups which is prepared by reacting cellulose with dichloroaminotriazines, trichlorotriazines, trichlorodiazines, tetrachlorodiazines, 2,3-dichloroquinoxalines, divinyl sulfone, epichlorohydrin or cyanogen bromide and the cellulose derivatives thus obtained are subsequently reacted with amino compounds such as ammonia, guanidine and amino acids, such as, arginine, histidine, tryptophane, α,γ-diaminobutyric acid, ornithine, citrulline and canavanine.

Definition of the Invention

The present invention relates to a laundry treatment composition comprising:

i) a polymer having an average repeat unit of:

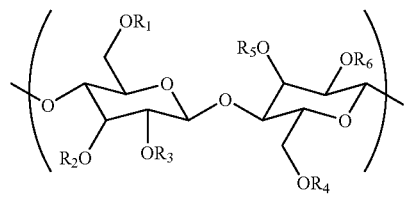

in which $R_{1-6}$ is independently of one another selected from H, a hydrolysable group, or a fibre reactive group in which when $R_{1-6}$ are a hydrolyzable group the degree of substitution is 0 to 1, and wherein $R_{1-6}$ is a fibre reactive group the degree of substitution is from 0.05 to 1 and;

ii) a carrier agent selected from surfactants, softening compounds or water with the proviso that when the carrier agent is water the composition further comprises perfume.

In the context of the present invention a hydrolysable group is defined as a group which undergoes hydrolysis under domestic laundering conditions In the context of the invention a fibre reactive group is defined as a group capable of forming a co-valent bond with a cellulose based fabric under domestic laundering conditions.

The invention also relates to use of the polymer described above for the softening of fabrics, colour care of fabrics (wherein colour care relates to colour fixing, dye transfer inhibition) and the prevention of wrinkles of fabrics.

The invention describes a new molecule having a polymeric structure having an average repeat unit of:

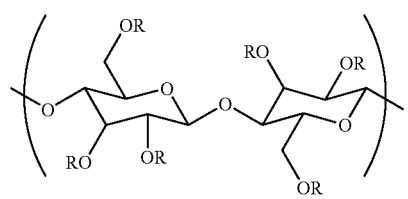

in which R is a combination of groups the following COCH3 (having a degree of substitution of 0 to 1),

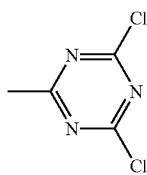

(having a degree of substitution of 0.05 to 1) and H (having a degree of substitution to balance the formula); wherein the substituent groups can be located in any of the R positions.

A method of manufacturing the polymers described above is described comprising the steps of:
i) dissolving the cellulose ester in an appropriate non aqueous solvent;
ii) adding a base and cyanuric halide;
iii) allowing the reaction to proceed;
iv) purifying the resulting product.

DETAILED DESCRIPTION OF THE INVENTION

The Cellulose Polymer

The polymer for use in the invention having an average repeat unit of:

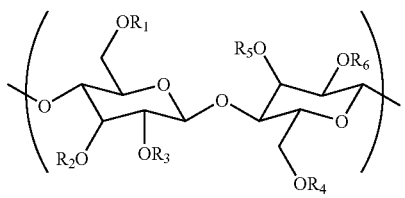

in which $R_{1-6}$ are independently of one another selected from H, a hydrolysable group, or a fibre reactive group in which when $R_{1-6}$ is a hydrolysable group the degree of substitution is 0 to 1, and wherein $R_{1-6}$ is a fibre reactive group the degree of substitution is from 0.05 to 1.

It is preferable if the fibre reactive groups are vinyl sulfones, methylol dihydroxy ethylene ureas, dicarboxylic acids and cyanuric chlorides and their derivatives Especially preferred as the fibre reactive group is:

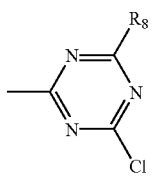

in which $R_8$ is selected from Cl or $OR_9$, $NHR_9$ and $R_9$ is a H, or $C_1$–$C_4$ alkyl chain.

It is preferable if the hydrolysable group is $(CO)R_7$ wherein $R_7$ is a phthalate group or a $C_1$ to $C_6$ alkyl chain, especially preferred is when the hydrolysable group is an acetate.

Throughout this specification, "average degree of substitution" refers to the number of substituted pendant groups per saccharide ring, averaged over all saccharide rings of the rebuild agent. Each saccharide ring prior to substitution has three —OH groups and therefore, an average degree of substitution of 3 means that each of these groups on all molecules of the sample, bears a substituent.

The average degree of substitution of the total of all group(s) pendant on the saccharide rings of the backbone being from 0.4 to 3, preferably from 0.4 to 1, more preferably from 0.5 to 0.75, most preferably from 0.6 to 0.7.

The average degree of substitution of the fibre reactive group is from 0.05 to 0.5, more preferably 0.1 to 0.3.

The average degree of substitution of the hydrolysable group is preferably from 0.1 to 0.8, more preferably 0.3 to 0.7.

A preferred polymer has an average repeat unit of:

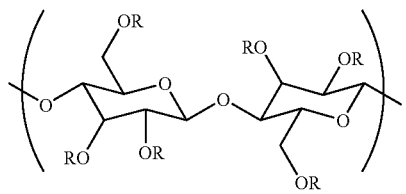

is a combination of groups the following COCH3 (having a degree of substitution 0.3 to 0.9, preferably 0.6);

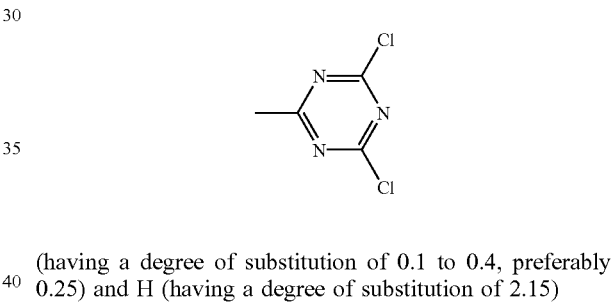

(having a degree of substitution of 0.1 to 0.4, preferably 0.25) and H (having a degree of substitution of 2.15)

The weight average molecular weight ($M_W$) of the polymer (as determined by GPC) may typically be in the range of 500 to 2,000,000 for example 1,000 to 1,500,000. Preferably though, it is from 1,000 to 100,000, more preferably from 5,000 to 50,000, especially from 10,000 to 15,000.

The cellulose polymers of the invention are also capable of reducing thinning of a fabric especially cellulose based fabric due to washing.

The cellulose polymer of the invention may be incorporated into compositions containing only a diluent and/or also comprising another active ingredient. The cellulose polymer is typically included in said compositions at levels of from 0.005% to 25% by weight, preferably 0.01% to 10%, most preferably 0.025% to 2.5%.

Synthetic Routes

The synthesis of the cellulose esters that are used as the starting materials for the polymers of the present invention are described in WO 00/18860.

The general synthesis of the polymers involves:
i) dissolving the cellulose ester in an appropriate non aqueous solvent
ii) adding a base and cyanuric halide,
iii) allowing the reaction to preceed,
iv) purifying the resulting product, it is highly preferred if the sequence of steps described above is followed.

It is preferable if the cyanuric halide is cyanuric chloride.

Compositions

The compositions of the invention may be in any physical form e.g. a solid such as a powder or granules, a tablet, a solid bar, a paste, gel or (especially aqueous) liquid. In particular the compositions may be used in laundry compositions, especially in liquid or powder laundry composition, for example for use in a wash and/or rinse and/or drying process.

The compositions of the present invention are preferably laundry compositions, especially main wash (fabric washing) compositions. The compositions may also be added as rinse-added softening compositions.

The laundry compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds.

The compositions of the invention may contain linear alkylbenzene sulphonate, particularly linear alkylbenzene sulphonates having an alkyl chain length of $C_8$–$C_{15}$. It is preferred if the level of linear alkylbenzene sulphonate is from 0 wt % to 30 wt %, more preferably 1 wt % to 25 wt %, most preferably from 2 wt % to 15 wt %.

The compositions of the invention may additionally or alternatively contain one or more other anionic surfactants in total amounts corresponding to percentages quoted above for alkyl benzene sulphonates. Suitable anionic surfactants are well-known to those skilled in the art. These include primary and secondary alkyl sulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Some particular examples of such other anionic surfactants are disclosed below

- alkyl ester sulphonates of the formula R—CH($SO_3$M)—COOR', where R is a $C_8$–$C_2$, preferably $C_{10}$–$C_{16}$ alkyl radical, R' is a $C_1$–$C_6$, preferably $C_1$–$C_3$ alkyl radical, and M is an alkaline cation (sodium, potassium, lithium), substituted or non-substituted ammonium (methyl, dimethyl, trimethyl, tetramethyl ammonium, dimethyl piperidinium, etc.) or a derivative of an alkanol amine (monoethanol amine, diethanol amine, triethanol amine, etc.);
- alkyl sulphates of the formula $ROSO_3$M, where R is a $C_5$–$C_{24}$, preferably $C_{10}$–$C_{18}$ alkyl or hydroxyalkyl radical, and M is a hydrogen atom or a cation as defined above, and their ethyleneoxy (EO) and/or propyleneoxy (PO) derivatives, having on average 0.5 to 30, preferably 0.5 to 10 EO and/or PO units;
- alkyl amide sulphates of the formula RCONHR'$OSO_3$M, where R is a $C_2$–$C_{22}$, preferably $C_6$–$C_{20}$ alkyl radical, R' is a $C_2$–$C_3$ alkyl radical, and M is a hydrogen atom or a cation as defined above, and their ethyleneoxy (EO) and/or propyleneoxy (PO) derivatives, having on average 0.5 to 60 EO and/or PO units;
- the salts of $C_8$–$C_{24}$, preferably $C_{14}$–$C_{20}$ saturated or unsaturated fatty acids, $C_8$–$C_{22}$, primary or secondary alkyl sulphonates, alkyl glycerol sulphonates, the sulphonated polycarboxylic acids described in GB-A-1 082 179, paraffin sulphonates, N-acyl,N'-alkyl taurates, alkyl phosphates, isethionates, alkyl succinamates, alkyl sulphosuccinates, monoesters or diesters of sulphosuccinates, N-acyl sarcosinates, alkyl glycoside sulphates, polyethoxycarboxylates, the cation being an alkali metal (sodium, potassium, lithium), a substituted or non-substituted ammonium residue (methyl, dimethyl, trimethyl, tetramethyl ammonium, dimethyl piperidinium, etc.) or a derivative of an alkanol amine (monoethanol amine, diethanol amine, triethanol amine, etc.);
- sophorolipids, such as those in acid or lactone form, derived from 17-hydroxyoctadecenic acid;

The compositions of the invention may contain non-ionic surfactant. Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Some particular examples of such nonionic surfactants are:

- polyalkoxylenated alkyl phenols (i.e. polyethyleneoxy, polypropyleneoxy, polybutyleneoxy), the alkyl substituent of which has from 6 to 12 C atoms and contains from 5 to 25 alkoxylenated units; examples are TRITON X-45, X-114, X-100 and X-102 marketed by Rohm & Haas Co., IGEPAL NP2 to NP17 made by RHÔNE-POULENC;
- $C_8$–$C_{22}$ polyalkoxylenated aliphatic alcohols containing 1 to 25 alkoxylenated (ethyleneoxy, propyleneoxy) units; examples are TERGITOL 15-S-9, TERGITOL 24-L-6 NMW marketed by Union Carbide Corp., NEODOL 45-9, NEODOL 23-65, NEODOL 45-7, NEODOL 45-4 marketed by Shell Chemical Co., KYRO EOB marketed by The Procter & Gamble Co., SYNPERONIC A3 to A9 made by ICI, RHODASURF IT, DB and B made by RHÔNE-POULENC;
- the products resulting from the condensation of ethylene oxide or propylene oxide with propylene glycol, ethylene glycol, with a molecular weight in the order of 2000 to 10,000, such as the PLURONIC products marketed by BASF;
- the products resulting from the condensation of ethylene oxide or propylene oxide with ethylene diamine, such as the TETRONIC products marketed by BASF;
- $C_8$–$C_{18}$ ethoxyl and/or propoxyl fatty acids containing 5 to 25 ethyleneoxy and/or propyleneoxy units;
- $C_8$–$C_{20}$ fatty acid amides containing 5 to 30 ethyleneoxy units;
- ethoxylated amines containing 5 to 30 ethyleneoxy units;
- alkoxylated amidoamines containing 1 to 50, preferably 1 to 25 and in particular 2 to 20 alkyleneoxy (preferably ethyleneoxy) units;
- amine oxides such as the oxides of alkyl $C_{10}$–$C_{18}$ dimethylamines, the oxides of alkoxy $C_8$–$C_{22}$ ethyl dihydroxy ethylamines;
- alkoxylated terpene hydrocarbons such as ethoxylated and/or propoxylated a- or b-pinenes, containing 1 to 30 ethyleneoxy and/or propyleneoxy units;
- alkylpolyglycosides obtainable by condensation (for example by acid catalysis) of glucose with primary fatty alcohols (e.g. U.S. Pat. Nos. 3,598,865; 4,565,647; EP-A-132 043; EP-A-132 046) having a $C_4$–$C_{20}$, preferably $C_8$–$C_{18}$ alkyl group and an average number of glucose units in the order of 0.5 to 3, preferably in the order of 1.1 to 1.8 per mole of alkylpolyglycoside (APG), particularly those having a $C_8$–$C_{14}$ alkyl group and on average 1.4 glucose units per mole a $C_{12}$–$C_{14}$ alkyl group and on average 1.4 glucose units per mole a $C_8$–$C_{14}$ alkyl group and on average 1.5 glucose units per mole a $C_8$–$C_{10}$ alkyl group and on average 1.6 glucose units per mole marketed under the names GLUCOPON 600 EC®, GLUCOPON 600 CSUP®, GLUCOPON 650 EC® and GLUCOPON 225 CSUP® respectively and made by HENKEL;

It is preferred if the level of total non-ionic surfactant is from 0 wt % to 30 wt %, preferably from 1 wt % to 25 wt %, most preferably from 2 wt % to 15 wt %.

Another class of suitable surfactants comprises certain mono-alkyl cationic surfactants useful in main-wash laundry compositions. Cationic surfactants that may be used include quaternary ammonium salts of the general formula $R_1R_2R_3R_4N^+ X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2–60%, preferably 15–40% most preferably 25–35%.

Detergent compositions suitable for use in most automatic fabric washing machines generally contain anionic non-soap surfactant, or non-ionic surfactant, or combinations of the two in any suitable ratio, optionally together with soap.

Any conventional fabric conditioning agent may be used in the compositions of the present invention. The conditioning agents may be cationic or non-ionic. If the fabric conditioning compound is to be employed in a main wash detergent composition the compound will typically be non-ionic. If used in the rinse phase, they will typically be cationic. They may for example be used in amounts from 0.5% to 35%, preferably from 1% to 30% more preferably from 3% to 25% by weight of the composition.

Preferred cationic fabric softening agents comprise a substantially water insoluble quaternary ammonium material comprising a single alkyl or alkenyl long chain having an average chain length greater than or equal to $C_{20}$ or, more preferably, a compound comprising a polar head group and two alkyl or alkenyl chains having an average chain length greater than or equal to $C_{14}$.

Preferably, the cationic fabric softening agent is a quaternary ammonium material or a quaternary ammonium material containing at least one ester group. The quaternary ammonium compounds containing at least one ester group are referred to herein as ester-linked quaternary ammonium compounds.

As used in the context of the quarternary ammonium cationic fabric softening agents, the term ester group', includes an ester group which is a linking group in the molecule.

It is preferred for the ester-linked quaternary ammonium compounds to contain two or more ester groups. In both monoester and the diester quaternary ammonium compounds it is preferred if the ester group(s) is a linking group between the nitrogen atom and an alkyl group. The ester groups(s) are preferably attached to the nitrogen atom via another hydrocarbyl group.

The compositions of the invention, when used as main wash fabric washing compositions, will generally also contain one or more detergency builders. The total amount of detergency builder in the compositions will typically range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula: 0.8–1.5 $Na_2O$. $Al_2O_3$. 0.8–6 $SiO_2$ These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N',N',-tetracetyl ethylenediamine (TAED) and sodium nonoyloxybenzene sulphonate (SNOBS). The novel quaternary ammonium and phosphonium bleach precursors disclosed in U.S. Pat. Nos. 4,751,015 and 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid, examples of such peracids can be found in U.S. Pat. Nos. 4,686,063 and 5,397,501 (Unilever). A preferred example is the imido peroxycarboxylic class of peracids described in EP A 325 288, EP A 349 940, DE 382 3172 and EP 325 289. A particularly preferred example is phtalimido peroxy caproic acid (PAP). Such peracids are suitably present at 0.1–12%, preferably 0.5–10%.

A bleach stabiliser (transistor metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylene diamine di-succinic acid). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s). Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilisins which are obtained from particular strains of *B. Subtilis B. licheniformis*, such as the commercially available subtilisins Maxatase (Trade Mark), as supplied by Gist Brocades N.V., Delft, Holland, and Alcalase (Trade Mark), as supplied by Novo Industri A/S, Copenhagen, Denmark.

Particularly suitable is a protease obtained from a strain of Bacillus having maximum activity throughout the pH range of 8–12, being commercially available, e.g. from Novo Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; inorganic salts such as sodium sulphate; lather control agents or lather boosters as appropriate; proteolytic and lipolytic enzymes; dyes; coloured speckles; perfumes; foam controllers; fluorescers and decoupling polymers. This list is not intended to be exhaustive.

It is often advantageous if soil release or soil suspending polymers are present, for example in amounts in the order of 0.0% to 10%, preferably in the order of 0.1% to 5% and in particular in the order of 0.2% to 3% by weight, such as cellulose derivatives such as cellulose hydroxyethers, methyl cellulose, ethyl cellulose, hydroxypropyl methyl cellulose, hydroxybutyl methyl cellulose;

polyvinyl esters grafted onto polyalkylene backbones, such as polyvinyl acetates grafted onto polyoxyethylene backbones (EP-A-219 048); polyvinyl alcohols;

polyester copolymers based on ethylene terephthalate and/or propylene terephthalate units and polyethyleneoxy terephthalate units, with a molar ratio (number of units) of ethylene terephthalate and/or propylene terephthalate/(number of units) polyethyleneoxy terephthalate in the order of 1/10 to 10/1, the polyethyleneoxy terephthalate units having polyethyleneoxy units with a molecular weight in the order of 300 to 10,000, with a molecular weight of the copolyester in the order of 1000 to 100,000;

polyester copolymers based on ethylene terephthalate and/or propylene terephthalate units and polyethyleneoxy and/or polypropyleneoxy units, with a molar ratio (number of units) of ethylene terephthalate and/or propylene terephthalate/(number of units) polyethyleneoxy and/or polypropyleneoxy in the order of 1/10 to 10/1, the polyethyleneoxy and/or polypropyleneoxy units having a molecular weight in the order of 250 to 10,000, with a molecular weight of the copolyester in the order of 1000 to 100,000 (U.S. Pat. Nos. 3,959,230, 3,962,152, 3,893,929, 4,116,896, 4,702,857, 4,770,666, EP-A-253 567, EP-A-201 124);

copolymers of ethylene or propylene terephthalate/polyethyleneoxy terephthalate comprising sulphoisophthaloyl units in their chain (U.S. Pat. Nos. 4,711,730, 4,702,857, 4,713,194);

terephthalic copolyester oligomers having polyalkyleneoxyalkyl sulphonate/sulphoaroyl terminal groups and optionally containing sulphoisophthaloyl units in their chain (U.S. Pat. Nos. 4,721,580, 5,415,807, 4,877, 896, 5,182,043, 5,599,782, 4,764,289, EP-A-311 342, WO92/04433, WO97/42293);

sulphonated terephthalic copolyesters with a molecular weight less than 20,000, obtained e.g. from a diester of terephthalic acid, isophthalic acid, a diester of sulphoisophthalic acid and a diol, in particular ethylene glycol (WO95/32997);

polyurethane polyesters, obtained by reaction of a polyester with a molecular weight of 300 to 4000, obtained from a terephthalic acid diester, possibly a sulphoisophthalic acid diester and a diol, on a prepolymer with isocyanate terminal groups, obtained from a polyethyleneoxy glycol with a molecular weight of 600 to 4000 and a diisocyanate (U.S. Pat. No. 4,201,824);

sulphonated polyester oligomers obtained by sulphonation of an oligomer derived from ethoxylated allyl alcohol, dimethyl terephthalate and 1,2-propylene diol, having 1 to 4 sulphonate groups (U.S. Pat. No. 4,968, 451);

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/l, more preferably at least 500 g/l. Especially preferred compositions have bulk densities of at least 650 g/litre, more preferably at least 700 g/litre.

Such powders may be prepared either by post-tower densification of spray-dried powder, or by wholly non-tower methods such as dry mixing and granulation; in both cases a high-speed mixer/granulator may advantageously be used.

Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Any suitable method may be used to produce the compounds of the present invention.

Treatment Process

Treatment of the fabric with the polymer can be made by any suitable method such as washing, soaking or rinsing of the substrate.

Typically the treatment will involve a washing or rinsing method such as treatment in the main wash or rinse cycle of a washing machine and involves contacting the fabric with an aqueous medium comprising the composition of the present invention.

The present invention will now be explained in more detail by way of the following non-limiting examples. Compositions of the invention are illustrated by a number comparative compositions are illustrated by a letter.

EXAMPLES

Example 1

Synthesis

Cellulose acetate with a degree of acetate substitution of 0.6 and molecular weight of 16000 (DS=0.6, mw=16k) was prepared according to method described in WO 00/18860. Cellulose acetate (DS=0.6, mw=16 k) (10 g) was dissolved in dimethyl acetamide (100 mL). Cyanuric chloride (9 g dissolved in 50 mL of dimethyl acetamide) and $Na_2CO_3$ (4 g) were added to the cellulose monoacetate solution and stirred at ambient temperature for 72 h. Following this the yellow solution was centrifuged, the supernatant separated and the solvent removed under reduced pressure to give a yellow oil. The oil was dissolved in water, resulting in a precipitate which was removed by centrifuging. Polymer A was isolated from the aqueous solution by precipitation into acetone, filtering and drying under vacuum to give a yellow coloured solid.

Yield 1.5 g.

CHN analysis: C, 33.7; H, 5.6; N, 3.7.

Degree of acetate substitution is 0.6.

Degree of cyanuric chloride is substitution 0.25.

Example 2

Synthesis

Cellulose acetate with a degree of acetate substitution of 0.6 and molecular weight of 16000 (DS=0.6, mw=16 k) was prepared according to method described in WO 00/18860. Cellulose acetate (DS=0.6, mw=16 k) (10 g) was dissolved in dimethyl acetamide (100 mL). Cyanuric chloride (6 g dissolved in 50 mL of dimethyl acetamide) and $Na_2CO_3$ (3 g) were added to the cellulose monoacetate solution and stirred at ambient temperature for 48 h. Following this the yellow solution was centrifuged, the supernatant separated and the solvent removed under reduced pressure to give a yellow oil. The oil was dissolved in water, resulting in a precipitate which was removed by centrifuging. Polymer A was isolated from the aqueous solution by precipitation into acetone, filtering and drying under vacuum to give a yellow coloured solid.

Yield 1.7 g.

CHN analysis: C, 37.4; H, 5.7; N, 0.9.

Degree of acetate substitution is 0.6.

Degree of cyanuric chloride substitution is 0.05.

Example 3

Softness Evaluation

For each sample and control, 2 40×40 cm$^2$ cloths were cut out of cotton. The woven cotton swatches were treated in the following solutions:

Composition A
    40 mL of 0.1 M carbonate buffer (pH~10.5)[a]
    360 mL demineralised water Composition B
    40 mL of 0.1 M carbonate buffer (pH~10.5)[a]
    0.16 g of cellulose acetate (DS=0.6, mw=16 k) (to give 0.4 g/L)
    360 mL demineralised water Composition 1
    40 mL of 0.1 M carbonate buffer (pH~10.5)[a]
    0.16 g of Polymer A Prepared as in Example 1 (to give 0.4 g/L)
    360 mL demineralised water
    [a] carbonate buffer is: 2.42 g of NaHCO$_3$+7.55 g Na$_2$CO$_3$ in 1 L of demineralised water The total amount of cloth added to each solution was 25.9 g, giving a liquor to cloth ratio of 15:1. The solutions and cloths were added to linitest pots and washed for 30 min at 40° C. at 40 rpm to simulate a standard wash. The cloths were rinsed in the linitester with 400 mL of deionised for 10 mins.

The cloths were then tumble-dried in a Miele Novotronic T430 on a hot setting for 40 min, ironed flat and then conditioned for at least 24 hr at 20° C. and 65% relative humidity.

The effect of Polymer A on softness was evaluated using a Kawabata Shear Tester. The results are shown in the following table:

|  | H.G. 0.5° | G |
| --- | --- | --- |
| Composition A | 3.38 | 1.20 |
| Composition B | 3.17 | 1.19 |
| Composition 1 | 3.04 | 1.12 |

The lower the H.G. value the softer the fabric as taught in WO92/13053.

A reduction in the value of HG for composition 1 shows that Polymer A gives an increased level of softness to the fabric.

Examples 4, 5 and 6

To the following solutions a 10 cm×10 cm white cotton cloth (desized, mercerised, bleached, non-fluorescent) and a 10 cm×10 cm black cotton (direct black 22—1% dyed from stock) were added. The cloths were also overlooked to stop any fraying into solution of fibres.

Woven cotton swatches were treated in the following solutions:

Composition C:
    5.0 mL of 0.1 M carbonate buffer (pH~10.5)[a]
    5.0 mL of 10 g/L surfactant solution[b]
    40.0 mL demineralised water Composition D:
    5.0 mL of 0.1 M carbonate buffer (pH~10.5)[a]
    5.0 mL of 10 g/L surfactant solution[b]
    0.02 g of cellulose acetate (DS=0.6, mw=16 k) (to give 0.4 g/L)
    40.0 mL demineralised water Composition 2
    5.0 mL of 0.1 M carbonate buffer (pH~10.5)[a]
    5.0 mL of 10 g/L surfactant solution[b]
    0.02 g of Polymer A (to give 0.4 g/L)
    40.0 mL demineralised water
    [a] carbonate buffer is: 2.42 g of NaHCO$_3$+7.55 g Na$_2$CO$_3$ in 1 L of demineralised water
    [b] surfactant solution is: 10.0 g of Linear Alkyl Sulfate (50% active)+5.0 g Synperonic A7 in 1 L of demineralised water The total amount of cloth added to each solution approximately 3.0 g, giving a liquor to cloth ratio of 16:1. The solutions and cloths were added to linitest pots and washed for 30 min at 40° C. at 40 rpm to simulate a standard wash. The cloths were then removed; rinsed in demin water and then tumble-dried for 30 mins. The cloths were then measured on the ICS Texicon Spectraflash. Settings were UV excluded from 420 nm, Specular included, Large aperture, 4 cloth thickness. Readings were also taken from a non-treated piece of the same fabrics (Direct Black 22 and white) to compare against. The spectral data was used to calculate CIELAB ΔE values.

For crease recovery angle measurement the samples were ironed flat and conditioned for at least 24 hr at 20° C. and 65% relative humidity. Samples of cloth 25 mm×50 mm were folded in half and compressed with a 1 kg load for 1 min. They were then place Crease Recovery Angle Tester Determiner and the angle read after 1 min. The crease recovery angle was determined from the average of six measurements in the warp direction The results are shown in the following tables:

Example 4

Percent Colour Strength

|  | Wash 3 | Wash 5 |
| --- | --- | --- |
| Composition C | 96.4 | 93.5 |
| Composition D | 96.0 | 97.5 |
| Composition 2 | 105.6 | 102.1 |

Composition 2 has the highest percentage of the initial colour.

The colour strength of greater than one hundred percent in composition 2 is due to slight shrinkage of the fabric upon contact with water which causes in increase in the amount of dye per unit fabric area as opposed to any intrinsic colour of the polymer. This effect happens with compositions C and D also but the effect is more than negated by the loss in dye from the fabric.

Example 5

White Monitor ΔE

|  | Wash 1 | Wash 2 | Wash 3 | Wash 4 | Wash 5 |
|---|---|---|---|---|---|
| Composition C | 13.9 | 15.3 | 16.2 | 16.8 | 17.6 |
| Composition D | 14.4 | 15.5 | 16.0 | 16.2 | 16.7 |
| Composition 2 | 13.7 | 14.5 | 15.3 | 15.7 | 16.2 |

Composition 2 has the lowest ΔE in each wash, which indicates the lowest pick up of dye onto the white monitor cloths.

Example 7

Crease Recovery Angle

|  | Wash 5 |
|---|---|
| Composition C | 60 |
| Composition D | 67 |
| Composition 2 | 67 |

Composition 2 has a higher crease recovery angle.

Example 6

The following are formulation examples. In each case "Polymer A" refers to the material specified in Example 1.

| Component | Specification |
|---|---|
| LAS | Linear Alkyl Benzene Sulphonic-acid, Marion AS3, ex Huls |
| Na-PAS | Primary Alkyl Benzene Sulphonic-acid, nuetralised with NaO |
| Dobanol 25-7 | C12–15 ethoxylated alcohol, 7EO, ex shell |
| Zeolite | Wessalith P, ex Degussa |
| STPP | Sodium Tri Polyphosphate, Thermphos NW, ex Hoechst |
| Dequest 2066 | Metal chelating agent, ex Mansanto |
| Silicone Oil | Antifoam, DB 100, ex Dow Corning |
| Lipolase | Type 100L, ex Novo |
| Savinase 16L | Protease, ex Novo |
| Sokalan CP5 | Acrylic/Maleic Builder Polymer, ex BASF |
| Deflocculating Polymer | Polymer A-11 disclosed in EO-A-346 995 |
| SCMC | Sodium Carboxymethyl Cellulose |
| Minors | Antiredeposition polymers, transition-matal scavangers/bleach stabilisers, fluorescers, antifoams, dye-transfer-inhibition polymers, enzymes, perfume |
| Polymer A | Material Specified in Example 1 |

| Component | % w/w |
|---|---|
| Composition 6, Spray-Dried Powder: | |
| Na PAS | 11.5 |
| Dobanol 25-7 | 6.3 |
| Soap | 2 |
| Zeolite | 24.1 |
| SCMC | 0.6 |
| Na Citrate | 10.6 |
| Na Carbonate | 23 |
| Polymer A | 0.3 |
| Silicone Oil | 0.5 |
| Dequest 2066 | 0.4 |
| Sokalan CP5 | 0.9 |
| Savinase 16L | 0.7 |
| Lipolase | 0.1 |
| Perfume | 0.4 |
| Water/salts | Up to 100% |
| Composition 7, Detergent granulate prepared by Non-Spray Drying Method: | |
| Na PAS | 13.5 |
| Dobanol 25-7 | 2.5 |
| STPP | 45.3 |
| Na Carbonate | 4 |
| Polymer A | 0.28 |
| Na Silicate | 10.1 |
| Minors | 1.5 |
| Water | up to 100% |
| Composition 8, Isotropic Laundry Liquid | |
| Na Citrate | 10.7 |
| Propylene Glycol | 7.5 |
| Ethylene Glycol | 4.5 |
| Borax | 3 |
| Savinase 16L | 0.3 |
| Lipolase | 0.1 |
| Polymer A | 0.25 |
| Monoethanolamine | 0.5 |
| Cocofatty acid | 1.7 |
| NaOH (50%) | 2.2 |
| LAS | 10.3 |
| Dobanol 25-7 | 6.3 |
| LES | 7.6 |
| Minors | 1.3 |
| (adjust pH to 7 with NaOH) | |
| Water | up to 100% |
| Composition 9, Structured Laundry Liquids | |
| LAS | 16.5 |
| Dobanol 25-7 | 9 |
| Oleic acid (Priolene (6907) | 4.5 |
| Zeolite | 15 |
| KOH, neutralisation of acids and pH to | 8.5 |
| Citric acid | 8.2 |
| Deflocculating Polymer | 1 |
| Protease | 0.38 |
| Lipolase | 0.2 |
| Polymer A | 0.15 |
| Minors | 0.4 |
| Water | up to 100% |

What is claimed is:

1. A laundry treatment composition comprising:
i) a polymer having an average repeat unit of:

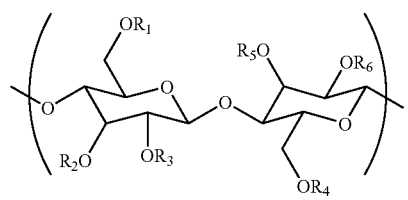

wherein R₁₋₆ are independently of one another members selected from the group consisting of H, a hydrolysable group and a fibre reactive group, wherein when the average degree of substitution of the hydrolysable group is 0 to 1, and wherein the average degree of substitution of the fibre reactive group is from 0.05 to 1 and;

ii) a carrier agent which is a member selected from the group consisting of surfactants, softening compounds or water;

with the proviso that when the carrier agent is water the composition further comprises perfume;

wherein said fibre reactive group is a member selected from the group consisting of a vinyl sulfones, methylol dihydroxy ethylene ureas, dicarboxylic acids and cyanuric chloride and its derivatives; and

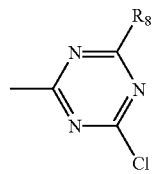

wherein $R_8$ is a member selected from the group consisting of Cl, $OR_9$ and $NHR_9$ wherein $R_9$ is a member selected from the group consisting of H and a $C_1$–$C_4$ alkyl chain; and wherein said hydrolysable group is $(CO)R_7$ wherein $R_7$ is a member selected from the group consisting of a phthalate group, a $C_1$ to $C_6$ alkyl chain and an acetate group.

2. A laundry composition according to claim 1, wherein the average degree of substitution of the total of all groups on the saccharide rings is from 0.4 to 3.

3. A laundry composition according to claim 2 wherein the average degree of substitution of the total of all groups on the saccharide rings is from 0.4 to 1.

4. A laundry composition according to claim 2, wherein the average degree of substitution of the total of all groups on the saccharide rings is from 0.5 to 0.75.

5. A laundry composition according to claim 2, wherein the average degree of substitution of the total of all groups on the saccharide rings is from 0.6 to 0.7.

6. A laundry composition according to claim 1, wherein the average degree of substitution of said fibre reactive group is from 0.05 to 0.5.

7. A laundry composition according to claim 1, wherein the average degree of substitution of said fibre reactive group is from 0.1 to 0.3.

8. A composition according to claim 1, wherein the average degree of substitution of said hydrolysable group is from 0.1 to 0.8.

9. A composition according to claim 8, wherein the average degree of substitution of said hydrolysable group is from 0.3 to 0.7.

10. A laundry composition according to claim 1 which further comprises a builder.

11. A laundry composition according to claim 1 which further comprises a surfactant.

12. A polymeric compound having an average repeat unit of the formula:

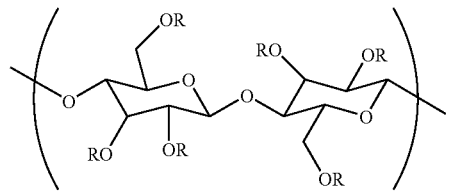

wherein R is a combination of groups comprising:
COCH3 having a degree of substitution of 0.3 to 0.9;

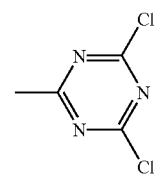

having a degree of substitution of 0.1 to 0.4; and
H having a degree of substitution to balance the formula;
wherein the substituent groups can be located in any of the R positions.

13. A polymeric structure according to claim 12 wherein R is a combination of groups comprising
COCH3 having a degree of substitution 0.6;

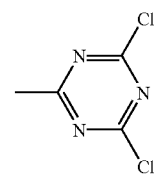

having a degree of substitution of 0.25;
and H having a degree of substitution of 2.15.

14. A method of treating fabric for the softening of the fabric comprising applying to the fabric a laundry treatment composition comprising:

i) a polymer having an average repeat unit of:

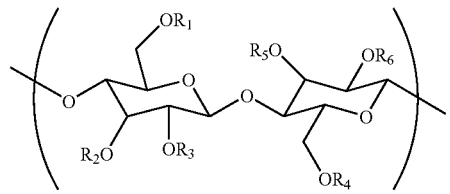

wherein R₁₋₆ are independently of one another members selected from the group consisting of H, a hydrolysable group and a fibre reactive group, wherein when the average degree of substitution of the hydrolysable group is 0 to 1, and wherein the average degree of substitution of the fibre reactive group is from 0.05 to 1 and;

ii) a carrier agent which is a member selected from the group consisting of surfactants, softening compounds or water;

wherein said fibre reactive group is a member selected from the group consisting of a vinyl sulfones, methylol dihydroxy ethylene ureas, dicarboxylic acids and cyanuric chloride and its derivatives; and

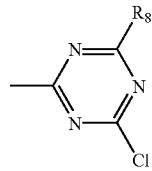

wherein $R_8$ is a member selected from the group consisting of Cl, $OR_9$ and $NHR_9$ wherein $R_9$ is a member selected from the group consisting of H and a $C_1$–$C_4$ alkyl chain; and wherein said hydrolysable group is $(CO)R_7$ wherein $R_7$ is a member selected from the group consisting of a phthalate group, a $C_1$ to $C_6$ alkyl chain and an acetate group.

15. A method of treating fabric to enhance the colour care thereof comprising applying to the fabric a laundry composition comprising:

i) a polymer having an average repeat unit of:

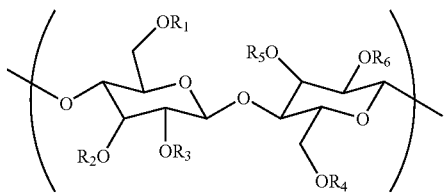

wherein $R_{1-6}$ are independently of one another members selected from the group consisting of H, a hydrolysable group and a fibre reactive group, wherein when the average degree of substitution of the hydrolysable group is 0 to 1, and wherein the average degree of substitution of the fibre reaction group is from 0.05 to 1 and;

ii) a carrier agent which is a member selected from the group consisting of surfactants, softening compounds or water;

wherein said fibre reactive group is a member selected from the group consisting of a vinyl sulfones, methylol dihydroxy ethylene ureas, dicarboxylic acids and cyanuric chloride and its derivatives; and

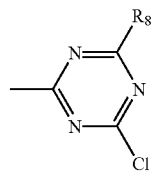

wherein $R_8$ is a member selected from the group consisting of Cl, $OR_9$ and $NHR_9$ wherein $R_9$ is a member selected from the group consisting of H and a $C_1$–$C_4$ alkyl chain; and wherein said hydrolysable group is $(CO)R_7$ wherein $R_7$ is a member selected from the group consisting of a phthalate group, a $C_1$ to $C_6$ alkyl chain and an acetate group.

16. A method of treating fabric for the prevention of wrinkles comprising applying to the fabric a laundry component comprising:

i) a polymer having an average repeat unit of:

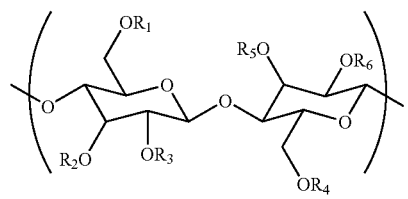

wherein $R_{1-6}$ are independently of one another members selected from the group consisting of H, a hydrolysable group and a fibre reactive group, wherein when the average degree of substitution of the hydrolysable group is 0 to 1, and wherein the average degree of substitution of the fibre reactive group is from 0.05 to 1 and;

ii) a carrier agent which is a member selected from the group consisting of surfactants, softening compounds or water;

wherein said fibre reactive group is a member selected from the group consisting of a vinyl sulfones, methylol dihydroxy ethylene ureas, dicarboxylic acids and cyanuric chloride and its derivatives; and

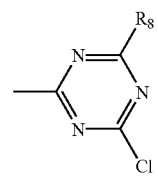

wherein $R_8$ is a member selected from the group consisting of Cl, $OR_9$ and $NHR_9$ wherein $R_9$ is a member selected from the group consisting of H and a $C_1$–$C_4$ alkyl chain; and wherein said hydrolysable group is $(CO)R_7$ wherein $R_7$ is a member selected from the group consisting of a phthalate group, a $C_1$ to $C_6$ alkyl chain and an acetate group.

* * * * *